Aug. 23, 1932.  W. E. MITTON  1,873,010
APPARATUS FOR TAKING SAMPLES OF MILK
Filed Jan. 17, 1928   4 Sheets-Sheet 2

Aug. 23, 1932.  W. E. MITTON  1,873,010
APPARATUS FOR TAKING SAMPLES OF MILK
Filed Jan. 17, 1928  4 Sheets-Sheet 4

INVENTOR
William E. Mitton
BY Archibald Cox
ATTORNEY

Patented Aug. 23, 1932

1,873,010

UNITED STATES PATENT OFFICE

WILLIAM E. MITTON, OF NEW LONDON, WISCONSIN, ASSIGNOR TO THE BORDEN COMPANY, OF NEW YORK, N. Y., A CORPORATION OF NEW JERSEY

APPARATUS FOR TAKING SAMPLES OF MILK

Application filed January 17, 1928. Serial No. 247,327.

The invention relates to an improvement in apparatus for taking samples of milk.

It is customary at milk receiving and treating stations to take a definite quantity from the milk delivered by each farmer to ascertain the butter content thereof and thereby determine the value of the milk. It is also customary at those stations where the milk is preserved in tin cans to take a proportionate quantity of the milk delivered by each farmer and then mix these samples together to ascertain the butter content of the whole supply of milk received by the station during a single day. The object of the present invention is to provide a simple and efficient apparatus by which a proportionate quantity of the milk delivered by each farmer may be taken and by which a substantially definite quantity of the milk delivered by each farmer may be taken at the same time. Thus by the present invention I produce an apparatus for taking the two samples simultaneously, an act which has heretofore, so far as I am aware, been accomplished in two separate steps. To this end the invention consists in the improved milk sample taking apparatus hereinafter fully described and particularly pointed out in the appended claims.

In the accompanying drawings illustrating the preferred form of the invention.

The improved apparatus for taking samples of milk, as illustrated in the drawings, comprises a master tube 15 in which the proportionate sample of milk is taken and a series of tubes 16 in which the substantially equal, specific samples of milk are taken. The tube 15 is closed at its upper end, whereas the tubes 16 are open at their upper ends. At their lower ends the tube 15 and the tubes 16 open into and are supported by an elongated manifold 17 which is rectangular in cross-section and is supported at its ends by the legs 18. The manifold 17 is a solid member provided with ducts for the passage of the milk into and from the tubes 15 and 16, and also provided under each tube with a transversely arranged conical valve seat. In these valve seats are located the valve 19 for controlling the passage of the milk into and from the master tube 15 and the valves 20 for controlling the passage of the milk into and from the tubes 16. A cross-bar 21 holds the upper ends of the tubes 16 against displacement. The tubes 15 and 16 may be formed of any suitable material, and the tube 15 is provided on its front face with a graduated glass panel 23. The panel 23 is graduated to indicate cubic centimeters, each graduation indicating five cubic centimeters.

In taking samples of milk proportionate to the quantity of milk delivered by the farmers, the operator ascertains within substantially five pounds how much milk the farmer in question delivers. He then controls the apparatus to take into the tube 15 a quantity of milk proportionate to the quantity delivered by the farmer. In actual practice, the operator admits into the tube 15 one and six-tenths cubic centimeters of milk for each pound of milk delivered by the farmer. It will be assumed for the purposes of the present description, however, that the operator admits into the tube 15 one cubic centimeter of milk for each pound delivered by the farmer, or five cubic centimeters for each five pounds of milk. After taking the proportionate sample of the milk delivered by each farmer, the sample is run into a receiving tank in which the aggregate or composite proportionate samples of milk are tested to ascertain the butter content of all the milk delivered to the station during the day.

Before each proportionate sample of milk is run out of the tube 15 into the composite sample tank a substantially definite quantity, for example, twenty cubic centimeters is abstracted from the tube 15 and run into one of the tubes 16. It will be noted that the tubes 16 vary in diameter and length, that the right hand tube 24 is shortest and is largest in diameter, whereas the left hand tube 25 is longest and is smallest in diameter, and that the intervening tubes between the right hand tube 24 and the left hand tube 25 increase in length and decrease in diameter proportionately to their distance from the master tube 15. Each tube 16 corresponds to one of the classes or divisions into which the farmers are placed according to the quantity of milk they customarily deliver at any one time to the station. For the purpose of illustration, it will be assumed that the right hand tube 24 is used for farmers delivering less than one hundred pounds of milk, that the second tube 26 is used for farmers delivering between one hundred and two hundred pounds of milk, and so on. The various classes or divisions may be arbitrarily fixed and divided from each other by a greater or less quantity of milk as found convenient. The sample of milk taken into each tube 16 is kept separate because on the test of its proportion of butter content is determined the price paid to the farmer for the milk he has delivered to the station.

This arrangement affords a quick and easy means of extracting a substantially definite quantity of milk from the proportionate sample in the graduated tube. Suppose for example the farmer delivers 700 lbs. of milk and that accordingly the operator admits milk into the graduated tube until it reaches the mark indicating 700 lbs. By opening the valve connected with the longest specified sample tube, namely, that numbered 25, it is apparent that the milk in the two tubes will come to a common level. Since only a substantially definite quantity of milk is wanted for the specific sample it is obvious that tube 25 must be of relatively small diameter to compensate for the height to which the milk will rise in it. This diameter is made proportionate to the distance the tube is from the graduated tube, since the passage leading from the graduated tube to the specific sample tube 25 will also be full of milk. On the other hand if only about 100 lbs. of milk are delivered by the farmer the valve of the shortest tube, that marked 24, will be opened. Since the milk will rise in tube 24 only a short distance, and the quantity must be definite to satisfy the requirements of the specific sample, it is obvious that tube 24 must be of relatively large diameter. This diameter is made proportionate to the distance the tube is from the graduated tube. The reason for having the specific sample tubes as long as they are shown in the drawings is to guard against any milk running out of the upper ends of the tubes when the valve associated with the graduated tube is opened to admit the milk into the specific sample tube.

The mechanism by which the proportionate milk sample is admitted into the master tube 15 and by which a definite quantity or specific sample is abstracted from the milk in the tube 15 and admitted into one of the tubes 16, and after which the remaining milk in the tube 15 is drained into the composite sample tank and the specific sample drained into the customary sample bottle comprises the following:—The milk delivered by each farmer is received in a weighing tank in which is located the inlet end of a pipe 28 the outlet end of which opens into a duct 29 formed in the lower right end of the manifold 27 and which leads to the larger end of the conical seat in which the master valve 19 is located. In the normal position of the valve 19 (Fig. 1), in which position the tube 15 is draining through the valve 19, the duct 29 is cut off from the tube 15 by the part 30 (Fig. 4) of the valve 19. When the proportionate sample of the milk in the weighing tank is to be admitted into the tube 15, the operator turns the handle 32 of the valve 19 in a counter-clockwise direction into the position indicated in Figs. 4 and 9, thereby bringing the forward end of a groove 33 formed longitudinally in the surface of the valve 19 into registry with the inner end of the duct 29. The rear end of the groove 33 communicates with the lower end of a hole 34 which passes transversely through the body of the valve 19, and when the valve 19 has been turned to the position shown in Figs. 4 and 9 the upper end of the hole 34 registers with a hole 35 in the manifold leading into the lower end of the tube 15. The operator permits the milk to flow into the tube 15 until its level reaches the point corresponding to the number of pounds of milk in the weighing tank. For example, if the farmer has delivered two hundred and eighty-five pounds of milk, the operator will permit the milk to rise in the tube 15 to the point indicated at 31 on the graduated panel 23. When the level of the milk has reached this point the operator then turns the handle 32 of the valve 19 in the reverse or clockwise direction to connect the upper end of the hole 34 with the discharge hole or outlet 36 of the tube 15 in the manifold, and the lower end of the hole 34 and the groove 33 with the duct 37 which is formed longitudinally in the front side of the manifold in alinement with the duct 29 and discharges at its other end through the pipe 39 into the composite sample tank.

Figure 9:
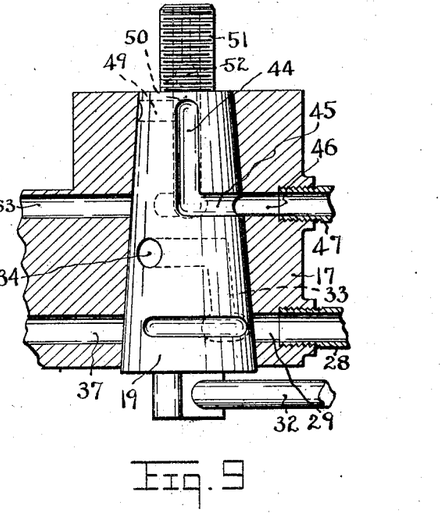
Fig. 9 is a section taken on the line 9—9 of Fig. 4.
Figure 10:
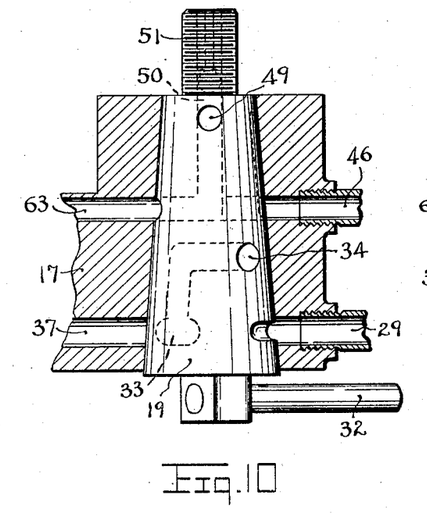
Fig. 10 is a view similar to Fig. 9, but showing the master valve in a different position.
Figure 11:
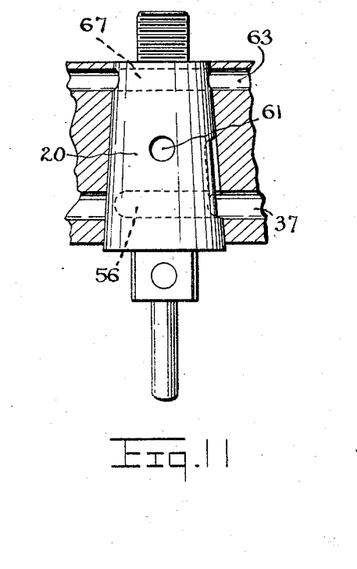
Fig. 11 is a section taken on the line 11—11 of Fig. 4.

The proportionate milk sample is drawn out of the weighing tank and into the tube 15 by creating a vacuum in the tube. For this purpose the upper end of the tube 15 opens at its rear side into the upper end of an upright pipe 40 located behind the tube 15. The lower end of the pipe 40 is in the rear edge of the enlarged right hand end of the manifold 17 and leads through the vertical hole 42 in the manifold into the upper side of the smaller end of the conical seat in which the valve 19 is located. While the valve 19 is in normal draining position, as indicated in Fig. 10, the part 43 (Fig. 5) of the valve 19 covers and thereby seals the lower end of the hole 42. When, however, the valve 19 has been turned to the position indicated in Figs. 4 and 9 to admit milk into the tube 15, the rear end of a groove 44 formed longitudinally in the smaller end of the valve 19 is brought into registry with the lower end of the hole 42. The forward end of the groove 44 opens into the upper end of an arcuate groove 45 formed on the right hand side of the valve and which is in constant registry with the inner end of a duct 46 formed in the lower rear side of the right hand end of the manifold 17. The duct 46 opens into a pipe 47 which is connected with a vacuum creating means (not shown). When the requisite quantity of milk has been forced into the tube 15 because of the vacuum therein and the valve 19 has been turned to connect the duct 37 with the tube 15 through the hole 34, the tube 15 is cut off from the vacuum creating means by the part 43 of the valve 19.

Before the 20-centimeter sample of milk can be withdrawn from the proportionate sample in the tube 15 it is necessary to break the vacuum above the milk in the tube 15. For this purpose the smaller end of the valve 19 is provided with a hole 49 extending radially from the surface of the valve to the axis thereof and communicating at its inner end with the inner end of a hole 50 formed axially in the smaller end of the valve and extending outwardly through the threaded stem 51 thereof. In the hole 50 is located an outwardly seating ball valve 52. While the valve 19 is in the position indicated in Figs. 4 and 9, in which position the tube 15 is in communication with the duct 29, the outer end of the hole 49 is covered by the adjacent part of the valve seat in the manifold. Consequently the air pressure has no effect on the valve 52. When, however, the valve 19 has been turned in the clockwise direction, cutting off the tube 15 from the vacuum creating means and bringing the outer end of the hole 49 into registry with the lower end of the hole 42, the ball valve 52 is unseated by the air pressure on its outer side, thereby permitting the air to fill the pipe 40 and the space in the tube 15 above the milk therein. Milk is thus permitted to run out of the tube 15 into the duct 37.

Figure 1:
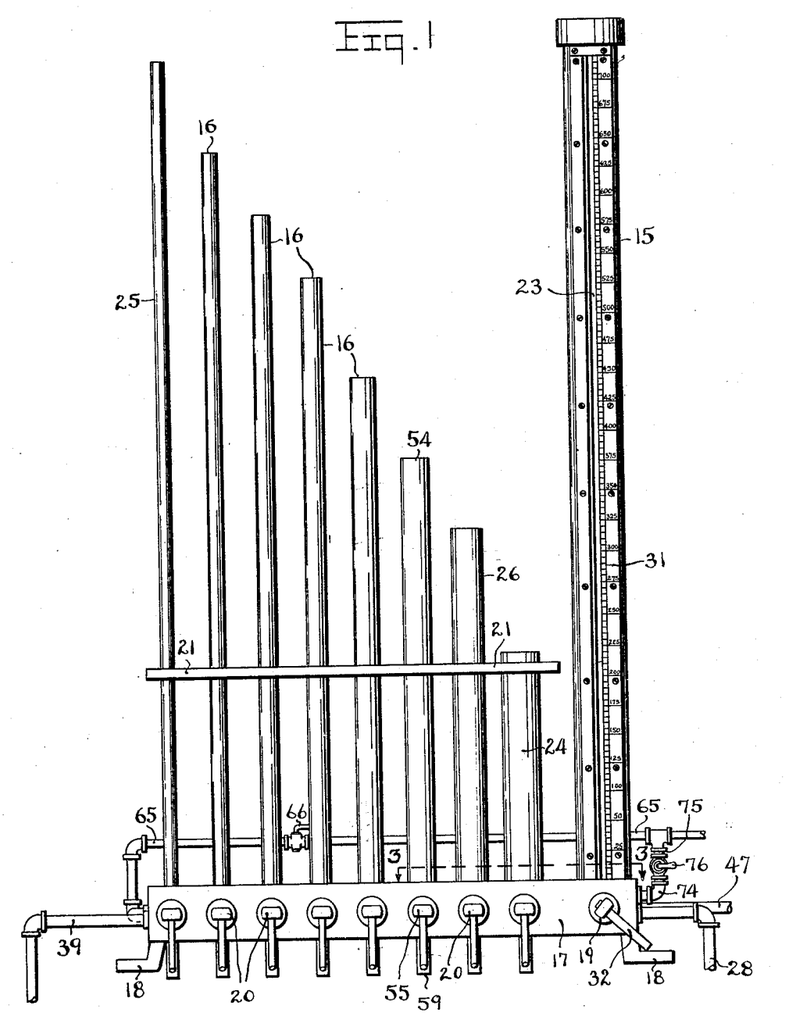
Fig. 1 is a front elevation of the improved apparatus for taking samples of milk.
Figure 2:
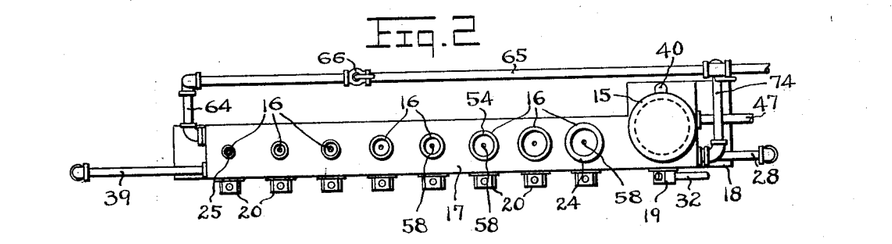
Fig. 2 is a top plan of the apparatus shown in Fig. 1.
Figure 3:
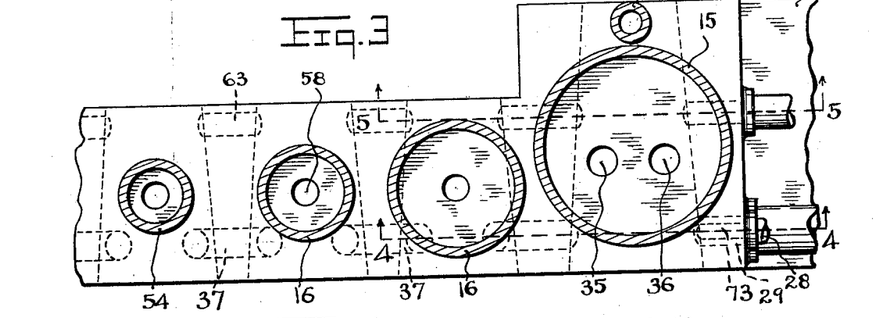
Fig. 3 is an enlarged longitudinal section through the right hand end of the apparatus, the section being taken on the line 3—3 of Fig. 1.
Figure 4:
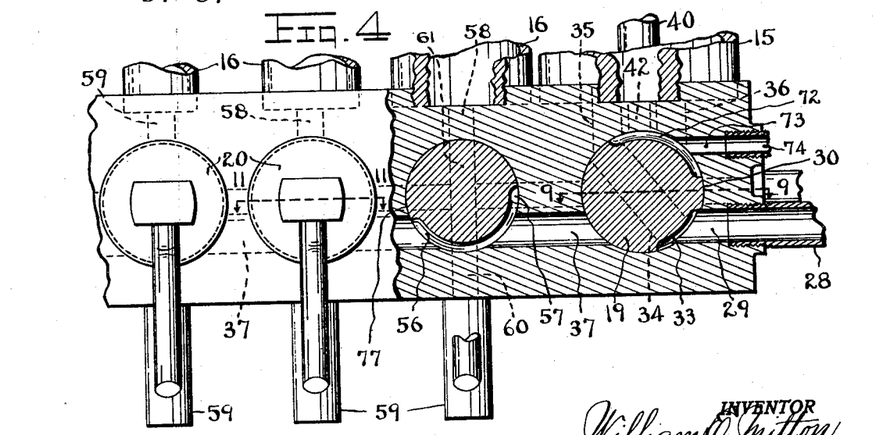
Fig. 4 is a front elevation of the part of the apparatus shown in Fig. 3, with the right hand end thereof taken on the line 4—4 of Fig. 3.
Figure 5:
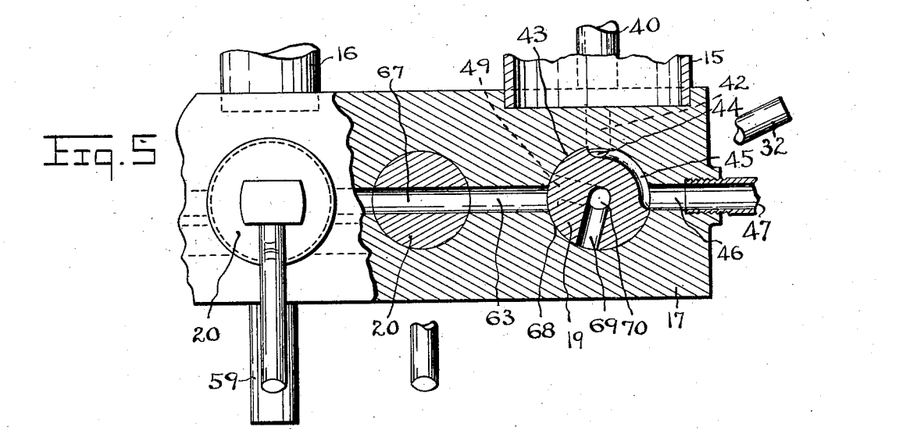
Fig. 5 is a view similar to Fig. 4, but with the sectional part taken on the line 5—5 of Fig. 3.
Figures 6, 7, 8:
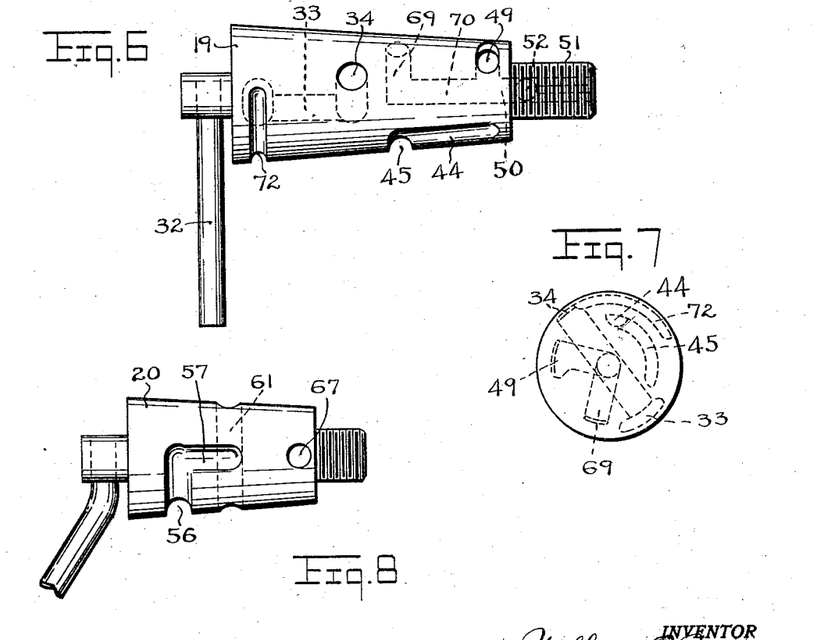
Fig. 6 is a side elevation of the master valve, this position showing to best advantage the various passages in the valve.
Fig. 7 is a front elevation of the valve shown in Fig. 6, with the passages therein indicated in dotted lines.
Fig. 8 is a side elevation of one of the valves for controlling the specific sample tubes.
Figure 12:
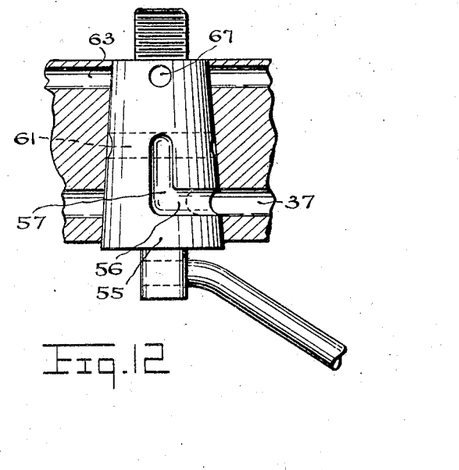
Fig. 12 is a view similar to Fig. 11, but showing the valve in a different position.

When the milk received from a farmer has been dumped into the weighing tank and the operator ascertains in what class the milk of the farmer has been placed, he turns the valve 20 of the tube corresponding to that class to connect the tube with the duct 37. In the present instance the milk delivered by the farmer falls in the class including all milk ranging from two hundred pounds to three hundred pounds, to which class tube 54 corresponds. Having found that the milk just received weighs two hundred and eighty-five pounds and that therefore it belongs in the class to which tube 54 corresponds the operator turns the valve 55 controlling tube 54 in a counter-clockwise direction. He does this before he turns the valve 19 to admit the proportionate sample of milk into the tube 15. By taking the precaution to turn the valve 55 previous to turning the valve 19 to admit milk into the master tube 15 the operator thereby makes sure that no milk will flow past the valve 55 in the duct 37 into the composite sample tank before the 20-centimeter sample is admitted into the tube 54 when the valve 19 is turned in the counter-clockwise direction to connect the tube 15 with the duct 37. The necessity for this precaution lies in the fact that while the valves 20 are in normal position, as indicated in Figs. 1 and 4, the arcuate grooves 56 formed in the larger ends thereof are in alinement with the duct 37 and thereby constitute with the duct 37 a free passage from the valve 19 into the pipe 39. When a valve 20 has been turned through an angle of substantially 90° in a counter-clockwise direction the duct 37 is put into communication with the tube 16 controlled by the valve 20 through the arcuate groove 56 which communicates at one end with the forward end of a groove 57 formed longitudinally in the surface of the valve. The inner end of the groove 57 while the valve 20 is in this position registers with the lower end of a hole 58 formed in the manifold and leading from the valve 20 up into the tube 16 above it. Thus when the valve 55 of the tube 54 has been turned to the position indicated in Fig. 12, and the proportionate sample of milk has been drawn into the tube 15 and the valve 19 thereof turned to permit the milk to run into the duct 37, the milk will flow through the duct as far as the valve 55 and then flow through the grooves 56 and 57 up into the tube 54, finding its level in the tube 54 which is open at its top end for this purpose. The quantity of milk thus drawn into the tube 54 is for practical purposes twenty cubic centimeters. The size and length of the tube 16 are proportioned, as explained above, to their distance from the master tube 15, and these dimensions take into consideration the quantity of milk in the duct 37 between the tube 15 and the specific tube 16 in question.

When the specific sample of milk has reached its level in the tube 54, the operator turns the valve 55 in a clockwise direction into normal position again. This act realines the arcuate groove 56 with the duct 37 to permit the remaining milk in the tube 15 to flow out through the pipe 39 into the composite sample tank and at the same time permits the milk in the tube 54 to flow out through the outlet pipe 59 into the specific sample bottle. The outlet pipe 59 alines with a hole 60 formed in the lower side of the manifold 17 in alinement with the hole 58. When the valve 55 was turned to its normal position the transverse hole 61 therein established a communication between the hole 58 and the hole 60 to permit the specific sample in the tube 54 to flow out through the outlet pipe 59 into the sample bottle.

In order that no milk may remain in the tube 15 or in the duct 37 on the completion of each sample taking operation and before the next sample of milk is let into the tube 15, I admit air under pressure into the upper end of the tube 15 to act on the milk therein to force it out of the tube and through the duct 37; but in order that this action may not take place until the specific sample has been let into its respective tube 16, I control the admission of the compressed air into the tube 15 by means of the valve 20 associated with the tube 16 which contains the specific sample of milk. The arrangement is such that the turning of the valve 20 to admit the specific sample of milk into its tube 16 shuts off the tube 15 from the source of compressed air, and on the other hand the turning of the valve 20 in the reverse direction to discharge the specific sample of milk through the outlet 59 permits the air under pressure to pass into the upper end of the tube 15. In the rear side of the manifold 17 and extending longitudinally throughout the length thereof is located a duct 63 which discharges at its right hand end into the valve seat in which is located the valve 19. At its left hand or inlet end the duct 63 is connected with the part 64 of a pipe 65 which leads to the source of the compressed air. In the pipe 65 is located a valve 66. In the rear or smaller end of each valve 20 is a transverse hole 67, and when all the valves 20 are in normal position, as indicated in Fig. 1, the holes 67 in the valves 20 all aline with the duct 63 and constitute with the duct 63 a continuous passage from the pipe 64 to the valve 19. While the valve 19 is in the position indicated in Figs. 4 and 9, admitting milk from the weighing tank into the tube 15, the duct 63 is shut off from the tube 15 by the part 68 (Fig. 5) of the valve 19. When, however, the valve 19 has been turned to put the tube 15 into communication with the duct 37 the outer end of a hole 69 in the valve 19 is brought into alinement with the discharge end of the duct 63. The hole 69 extends radially inward to the axis of the valve 19 and at its inner end communicates with the forward end of an axial hole 70 which communicates at its rear end with the axial hole 50. Since the turning of the valve 19 to put the tube 15 into communication with the duct 37 alines the hole 49 in the valve 19 with the hole 42 in the manifold 17 there is now a free passage from the duct 63 up into the upper part of the tube 15. No compressed air, however, is admitted into the discharge end of the duct 63 under these conditions until after the valve 20 associated with the tube 16 containing the specific sample of milk has been returned to normal position. When the compressed air is admitted into the hole 70 of the valve 19 it acts on the ball valve 52 to close it and prevent leakage of the compressed air.

The turning of the valve 19 in the clockwise direction to shut off the duct 29 from the tube 15 and to connect the tube 15 with the duct 37 puts the duct 29 in communication with the source of compressed air to force any milk remaining in the duct 29 and in the pipe 28 back into the weighing tank. In the larger end of the valve 19 is formed an arcuate groove 72 which, when the valve 19 is in the position shown in Figs. 4 and 9, is out of communication with the duct 29. But when the valve 19 has been turned to the position shown in Fig. 10 the lower end of the groove 72 is in communication with the duct 29 and the upper end of the groove 72 is in communication with a duct 73 which connects at its outer end with a pipe 74 connected by the upright pipe 75 with the pipe 65. In the pipe 75 is a valve 76. It is thus seen that the turning of the valve 19 in the counter-clockwise direction to shut off the tube 15 from the duct 29 puts the duct 29 in communication with the source of compressed air, although the tube 15 is not put in communication with the source of compressed air until after the valve 20 controlling the specific sample of milk has been turned back to normal position.

The mode of operation of the improved apparatus for taking samples of milk is as follows:—It is assumed that the farmer has delivered two hundred and eighty-five pounds of milk at the station and that consequently the operator turns the valve 55 of the tube 54 which tube corresponds to the class in which the farmer is placed. The operator then turns the valve 19 to the position indicated in Figs. 4 and 9 to permit the milk to reach the point indicated at 31 on the panel 23. The milk now in the tube 15 is a proportionate sample of the quantity of milk delivered by the farmer. The turning of the valve to the position shown in Figs. 4 and 9 connects the rear end of the groove 44 with the lower end of the hole 42, thereby putting the tube 15 through the pipe 40, the groove 45 and the duct 46, in communication with the vacuum creating means to draw the milk from the weighing tank through the pipe 28, the duct 29, the hole 34 and the hole 35 up into the tube 15. The turning of the valve 55 associated with the tube 54 previous to turning the valve 19 resulted in putting the duct 37 into communication with the tube 54 through the groove 56, the groove 57 and the hole 58. This turning of the valve 55 causes the part 77 thereof to cut off the passage through the duct 37 beyond the valve 55. Consequently when the valve 19 is turned to the position shown in Fig. 10, a portion of the milk in the tube 15 will flow through the duct 37 up into the tube 54 and find its level therein. The turning of the valve 19 in a clockwise direction cuts off the groove 44 from the hole 42 and puts the hole 49 in alinement therewith to admit air past by the valve 52 into the pipe 40 to break the vacuum in the tube 15 and permit the milk to flow freely out of the tube. The specific sample of milk taken into the tube 54 is discharged through the outlet 59 into a sample bottle by turning the valve 55 back to normal position. This return of the valve 55 to normal position brings the groove 56 into alinement with the duct 37 again to permit the remainder of the milk in the tube 15 to flow out through the pipe 39 into the composite sample tank. And the turning of the valve 55 to normal position realines the hole 67 in its rear end with the duct 63 to admit air under pressure into the upper part of the tube 15 to effect the complete and speedy removal of the milk in the tube 15 and the duct 37, the turning of the valve 19 in the clockwise direction having realined the hole 69 with the duct 63 at the same time that the hole 49 was realined with the hole 42. The apparatus is now in condition for taking another composite sample and another specific sample of milk.

What I claim is new and desire to secure by Letters Patent is:—

1. An apparatus of the character described comprising; an upright graduated tube, a series of upright specific sample tubes, a manifold in which the tubes are mounted and having passages by which the lower end of the graduated tube may be put into communication with the lower ends of the specific sample tubes, means whereby a predetermined amount of milk may be transferred to the graduated tube, and controllable means whereby a predetermined quantity of the milk in the graduated tube may be discharged therefrom into one of the specific sample tubes.

2. An apparatus of the character described comprising, an upright graduated tube, means whereby a predetermined quantity of milk may be transferred to the graduated tube, an upright specific sample tube, a manifold in which the tubes are supported, there being a duct in the manifold through which the lower end of the specific sample tube is adapted to be put into communication with the lower end of the graduated tube, means for controlling the admission of milk into the graduated tube and for controlling the passage of milk from the graduated tube into the duct leading to the specific sample tube, and means for controlling the passage of milk from the duct into the specific sample tube and the discharge of the milk from the specific sample tube.

3. An apparatus of the character described comprising, an upright graduated tube, means adapted for connecting the top of the proportionate sample tube to a vacuum creating means whereby a vacuum may be created in the tube to permit milk to flow into it through the lower end thereof, an upright specific sample tube, a manifold in which the tubes are mounted, there being a duct in the manifold through which the lower end of the specific sample tube is adapted to be put into communication with the lower end of the graduated tube, means for controlling the admission of milk into the graduated tube and for controlling the passage of milk from the graduated tube into the duct, and means for controlling the passage of milk from the duct into the specific sample tube and the discharge of the milk from the specific sample tube.

4. An apparatus of the character describe comprising, an upright tube arranged to receive proportionate samples of the batches of milk to be tested, an upright specific sample tube, a manifold in which the tubes are mounted, there being a duct in the manifold through which the lower end of the proportionate sample tube may communicate with the lower end of the specific sample tube, means associated with the proportionate sample tube to admit milk into the tube and to drain the milk from the tube into the duct between the two tubes, and means associated with the specific sample tube for controlling the admission of a definite quantity of the milk into the specific sample tube, and for controlling the discharge of the remainder of the milk in the proportionate sample tube from the apparatus.

5. An apparatus of the class described comprising, an upright tube arranged to receive proportionate samples of the batches of milk to be tested, a series of upright specific sample tubes decreasing in diameter and increasing in length proportionately to their distance from the proportionate sample tube, a manifold in which the lower ends of the tubes are mounted, said manifold having passages through which the lower end of the proportionate sample tube may communicate with the lower ends of the specific sample tubes, controllable means for admitting a predetermined quantity of milk into the proportionate sample tube, and means whereby a substantially definite quantity of the milk in the proportionate sample tube may be admitted into a specific sample tube irrespective of its distance from the proportionate sample tube.

6. An apparatus of the character described comprising, an upright graduated tube closed at its upper end, a series of upright specific sample tubes open at their upper ends, a manifold in which the lower ends of the tubes are fixed, said manifold having a passage leading into the graduated tube, a passage leading from the graduated tube into the specific sample tubes, and a passage leading from each of the specific sample tubes, a valve in the manifold and having provision for controlling the passages leading into and from the graduated tube, a series of valves in the manifold corresponding to the specific sample tubes and having provision for controlling the passages leading into and from the sample tubes, respectively, means adapted for connecting the top of the graduated tube to a vacuum creating means whereby a vacuum may be created in the graduated tube so that milk may be transferred thereto, means whereby air may be admitted into the graduated tube so as to break the vacuum therein and permit milk to be discharged therefrom into a specific sample tube, and means whereby compressed air may be admitted into the graduated tube to force the remaining milk out of the graduated tube and out of a passage in the manifold.

7. An apparatus of the character described comprising, an upright graduated tube closed at its upper end, a series of upright specific sample tubes open at their upper ends, a manifold in which the lower ends of the tubes are fixed, said manifold having a passage leading into the graduated tube, a passage leading from the graduated tube into the specific sample tubes, and a passage leading from each of the specific sample tubes, a valve in the manifold and having provision for controlling the passages leading into and from the graduated tube, a series of valves in the manifold corresponding to the specific sample tubes and having provision for controlling the passages leading into and from the sample tubes, respectively, means adapted for connecting the top of the graduated tube to a vacuum creating means whereby a vacuum may be created in the graduated tube so that milk may be transferred thereto, and means whereby the vacuum may be broken in the upper part of the graduated tube to permit the milk to be transferred therefrom.

8. An apparatus of the character described comprising, an upright tube closed at its upper end and adapted to receive proportionate samples of the batches of milk to be tested, a series of upright specific sample tubes open at their upper ends and decreasing in diameter and increasing in length proportionately to their distance from the proportionate sample tube, an elongated manifold in which the lower ends of the tubes are mounted, said manifold having a passage leading into the proportionate sample tube, a passage leading from the proportionate sample tube into the specific sample tubes, and a passage leading from each of the specific sample tubes, a valve in the manifold and having provision for controlling the passages leading into and from the proportionate sample tube, a series of valves in the manifold corresponding to the specific sample tubes and having provision for controlling the passages leading into and from the specific sample tubes, respectively, means adapted for connecting the top of the proportionate sample tube to a vacuum creating means whereby the air may be withdrawn from the proportionate sample tube to permit a predetermined amount of milk to be admitted into the tube, means whereby air may be admitted into the proportionate sample tube to permit milk to be discharged therefrom into a specific sample tube, and means whereby compressed air may be admitted into the proportionate sample tube to force out any milk remaining in the tube or in a passage of the manifold.

9. In an apparatus of the character described, a tube, means adapted for connecting the tube with a vacuum creating means whereby a predetermined quantity of milk may be admitted into the tube, a valve for controlling the admission of the milk into the tube, and means for receiving and thereby automatically measuring a substantially definite quantity of milk from the tube, said means comprising one of several tubes of different diameters and lengths.

10. In an apparatus of the character described, a tube, means adapted for connecting the tube with a vacuum creating means whereby a predetermined qauntity of milk may be admitted into the tube, a valve for controlling the admission of the milk into the tube, means for receiving and thereby automatically measuring a substantially definite quantity of milk from the tube, said means comprising one of a group of tubes, all of which are arranged for connection with the first-mentioned tube and means whereby the remainder of the milk in the first-mentioned tube may be withdrawn therefrom.

11. In an apparatus of the character described, a graduated tube in which a proportionate sample of milk may be taken, means adapted for connecting the tube with a vacuum creating means whereby the milk is admitted into the tube, means for controlling the admission of the milk into the tube, and means for receiving and thereby automatically measuring a substantially definite sample of milk from the proportionate sample in the tube, said means comprising one of a group of tubes connected to the graduated tube.

WILLIAM E. MITTON.